(12) United States Patent
Haskew

(10) Patent No.: US 7,391,311 B2
(45) Date of Patent: Jun. 24, 2008

(54) CARRYING CARGO REMINDER AND METHOD OF REMINDING ABOUT TRANSPORTATION OF EXTERNAL CARGO

(75) Inventor: Tim A. Haskew, Northport, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 133 days.

(21) Appl. No.: 11/062,603

(22) Filed: Feb. 22, 2005

(65) Prior Publication Data

US 2006/0187012 A1     Aug. 24, 2006

(51) Int. Cl.
B60Q 1/50     (2006.01)

(52) U.S. Cl. ............... 340/467; 340/440.4; 340/57; 340/459; 340/669; 180/290

(58) Field of Classification Search ........... 340/467, 340/440, 457, 459, 669
See application file for complete search history.

(56) References Cited

U.S. PATENT DOCUMENTS

| | | | | |
|---|---|---|---|---|
| 4,887,249 A | * | 12/1989 | Thinesen | 368/10 |
| 5,389,912 A | | 2/1995 | Arvin | |
| 5,424,713 A | | 6/1995 | Thompson et al. | |
| 5,963,129 A | * | 10/1999 | Warner | 340/468 |
| 5,995,001 A | * | 11/1999 | Wellman et al. | 340/438 |
| 6,007,094 A | * | 12/1999 | Hosoda | 280/735 |
| 6,014,602 A | * | 1/2000 | Kithil et al. | 701/45 |
| 6,100,792 A | * | 8/2000 | Ogino et al. | 340/426.25 |
| 6,185,489 B1 | * | 2/2001 | Strickler | 701/29 |
| 6,366,844 B1 | * | 4/2002 | Woywod et al. | 701/83 |
| 6,452,487 B1 | * | 9/2002 | Krupinski | 340/440 |
| 6,456,194 B1 | * | 9/2002 | Carlson et al. | 340/440 |
| 6,737,960 B2 | | 5/2004 | Preston | |
| 6,741,169 B2 | * | 5/2004 | Magiawala et al. | 340/438 |
| 6,911,905 B2 | * | 6/2005 | Carlson et al. | 340/467 |
| 7,129,826 B2 | * | 10/2006 | Nitz et al. | 340/436 |
| 2002/0038193 A1 | * | 3/2002 | Grunberg et al. | 702/173 |
| 2002/0171542 A1 | * | 11/2002 | Bloomfield et al. | 340/464 |
| 2004/0236474 A1 | * | 11/2004 | Chowdhary et al. | 701/1 |
| 2005/0033486 A1 | * | 2/2005 | Schmitt et al. | 701/1 |
| 2005/0171663 A1 | * | 8/2005 | Mittelsteadt et al. | 701/35 |

* cited by examiner

Primary Examiner—Benjamin C. Lee
Assistant Examiner—Hoi C. Lau
(74) Attorney, Agent, or Firm—Oblon, Spivak, McClelland, Maier & Neustadt, P.C.

(57) ABSTRACT

A cargo reminder for a driver of a vehicle includes an accelerometer, a controller to detect an acceleration change in the vehicle based on output signals from the accelerometer, and an alarm connected to the controller. Different types of alarm may be used, including a visual alarm, an audio alarm, a plug-in vibrator clip, or a combination of these alarms. In use, the alarm is triggered by the controller when the acceleration change is larger than a preset acceleration threshold. The cargo reminder may also include an acceleration threshold input to allow the driver to input the preset acceleration threshold, a delay setting input to allow the driver to input a time delay between first and second alarm triggers, and an inclinometer. A method for reminding the driver of a vehicle of an external cargo being transported is also within the scope of the instant invention.

30 Claims, 4 Drawing Sheets

CARRYING CARGO REMINDER AND METHOD OF REMINDING ABOUT TRANSPORTATION OF EXTERNAL CARGO

BACKGROUND OF THE INVENTION

1. Field of the Invention

The present invention relates to vehicle cargo reminders and, more particularly, to a non-intrusive cargo reminder having an alarm triggered by a change in acceleration of the vehicle.

2. Description of the Related Art

It is not an uncommon occurrence for drivers of vehicles transporting roof-mounted cargo, towing high profile trailers, or simply having an oversized height to be involved in accidents in which an overhead obstruction is hit because the driver was unaware, or forgot, about the cargo being transported, or the characteristics of the vehicle being driven or of the trailer being towed.

Examples of devices designed to remind a driver of cargo being transported include a drop down flag or sign attached to a garage door that hangs down when the garage door is opened. Another is a spring-loaded magnetic device with a popup warning that the driver attaches to the hood of his or her car. When the car is driven at speeds above a certain minimum, wind resistance forces the spring-loaded warning down from the view of the driver. When the speed of the car falls below the minimum value, the popup warning is brought up by the action of a spring or other similar actuator. Several problems exist with both of these systems. The first device is limited to warn the driver only when parking a car in the garage installed with the device. Both the first and second devices have to be disabled manually by the driver when no cargo is being transported.

U.S. Pat. No. 6,737,960, issued on May 18, 2004, discloses an automatic reminder alarm for a recreational equipment vehicle rack having a transmitter placed in proximity of a garage, a receiver located inside the car, an alarm connected to and triggered by the receiver, and an actuating device that automatically activates the receiver when recreational equipment is mounted in the vehicle rack. The receiver triggers the alarm when it is in range of the transmitter and the actuator has activated the receiver. The high cost associated with the need for two transducers, i.e., a receiver and an actuating device, makes this system unattractive. In addition, the need to have a transducer located outside of the vehicle is also unappealing.

U.S. Pat. No. 5,389,912, issued on Feb. 14, 1995, illustrated a truck clearance anti-collision system that uses an ultrasonic wave transmitter and an ultrasonic wave receiver for receiving waves generated by the ultrasonic wave transmitter reflected off an object disposed vertically above the vehicle. The device is mountable on a portion of a vehicle for transmitting substantially vertical ultrasonic waves. A computer device operatively associated with the ultrasonic wave transmitter and receiver calculates the vertical difference between the object and the height of the truck and provides human-recognizable information to the operator of the truck as to the vertical clearance available between the object and an uppermost portion of the vehicle. The cost of this system is also relatively high because of the different transducers needed and the need for professional installation and maintenance.

An overhead warning detector is disclosed in U.S. Pat. No. 5,424,713, issued on Jun. 13, 1995. The disclosed detector includes a terminal box positioned on top of a truck cab. The terminal box has a rotating member having a vertically extending antenna, or feeler. The antenna or feeler is adjustable in height to an elevation corresponding to the elevation of the highest point of the trailer of the truck. A control panel connected to the terminal box has an alarm that is actuated when the rotating member is turned when the vertically extending member contacts an obstacle having a clearance lower than the highest point of the trailer. Such a system is cumbersome to use because the user has to physically adjust the height of the vertically extending antenna each time the maximum height of the vehicle changes.

Therefore, in view of the above-noted brief summary of prior art inventions and their associated limitations, a need exists for an inexpensive cargo warning system that requires no professional installation, no external transducers, and little maintenance.

SUMMARY OF THE INVENTION

In one preferred embodiment of the present invention a cargo reminder for a driver of a vehicle is disclosed that includes an accelerometer, a controller configured to detect an acceleration change in the vehicle based on output signals from the accelerometer and an input signal indicative of the presence of cargo, and an alarm connected to the controller, the alarm being triggered by the controller when the acceleration change is larger than a preset acceleration threshold.

In another embodiment of the instant invention, a cargo reminder for a driver of a vehicle includes an accelerometer, a controller configured to detect an acceleration change in the vehicle based on output signals from the accelerometer and an input signal indicative of the presence of cargo, an alarm triggered by the controller when the acceleration change is larger than a preset acceleration threshold, an acceleration threshold input to allow the driver to input the preset acceleration threshold, and a delay setting input to allow the driver to input a time delay between first and second alarm triggers, where the alarm is at least one of a visual alarm, an audio alarm, or a plug-in vibrator clip.

In yet another embodiment of the invention, a cargo reminder for a driver of a vehicle includes an accelerometer and means for generating a reminder to the driver that an external cargo is being transported based on a change in vehicle acceleration detected by the accelerometer.

A method for reminding a driver of a vehicle of an external cargo being transported is also within the scope of the disclosed invention. The method includes the steps of measuring a change in acceleration of the vehicle, and triggering an alarm when the acceleration change is larger than a preset acceleration threshold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
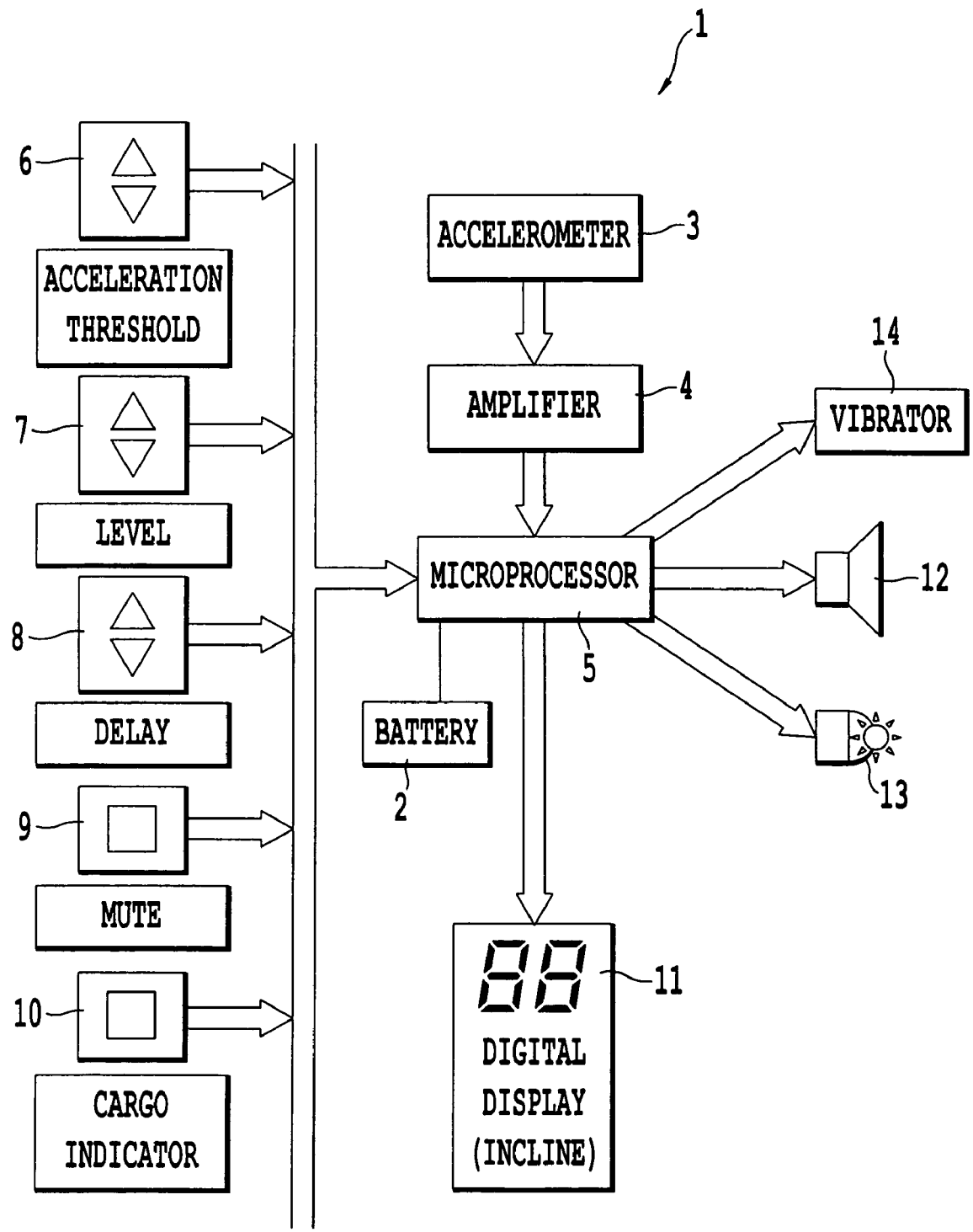
FIG. 1 illustrates a schematic of a cargo reminder of the invention.

Referring now to the drawings, wherein like reference numerals designate identical or corresponding parts throughout the several views, FIG. 1 illustrates a schematic of a cargo reminder 1 according to one of the preferred embodiments of the invention, which is useful in several applications and not limited by external transducers placed on specific locations, such as a garage door or external areas of a vehicle. The cargo reminder 1 is a device that may be plugged in to a power outlet of a vehicle and simply placed on a dashboard or console of the truck or car for use. The cargo reminder 1 can also operate on its own power, as for example, by the use of a battery 2.

The present inventor has noticed that most cargo impacts occur in instances where the vehicle is decelerating, or slowing down. As such, the cargo reminder 1 uses an accelerometer 3 to detect vehicle acceleration. At any time, when the driver slows down at or above a preset acceleration threshold, an alarm is triggered, thereby reminding the driver of an external cargo being carried and the potential impact against external obstructions. Such a system is advantageous because it is simple to use, requiring only placement inside of the vehicle and turning it on for proper operation. It does not require external detectors or transducers or professional installation and/or calibration. Also, by being connected to a power outlet in the vehicle, or otherwise connected to the electric circuit of the car, the cargo reminder will turn on every time the vehicle is started, thus eliminating the need for the driver to remember to enable the device when he or she mounts cargo to the vehicle. However, in one of the preferred embodiments of the invention, the cargo reminder 1 has its own on/off switch.

As shown in FIG. 1, the cargo reminder 1 includes an accelerometer 3 and its associated amplifier 4 connected to a microprocessor 5. Although a single box is used to illustrate the amplifier 4, circuitry for conditioning the output signals from the accelerometer 3 may actually contain a plurality of amplifiers. The cargo reminder 1 may also have several user-controlled input keys, including, but not limited to, an acceleration threshold key 6 to vary the preset acceleration threshold, a level offset key 7 to remove a bias from the accelerometer output caused by inclination of the cargo reminder inside of the vehicle, a delay setting key 8 to control the time between consecutive alarm triggers, and a mute key 9 to enable the driver to silence any of the triggered alarms. However, although specific mention is made here of user-controlled keys, any equivalents, including, but not limited to, switches, potentiometers, remotely transmitted signals, and others, are also within the scope of the present invention. As also illustrated and further explained below, the device has a digital display 11 to present to the driver the inclination, or slope, of the location where the vehicle is traveling or parked.

Within the scope of the disclosed invention is a user-activated cargo indicator 10 connected to the microprocessor 5 as shown in FIG. 1. Once cargo is loaded onto the vehicle, the cargo indicator 10 is adapted to generate a signal indicative of the presence of cargo so as to enable or disable the cargo reminder 1. Non-limiting examples of the cargo indicator 10 include, but are not limited to, a user-controlled switch, a potentiometer, or a receiver adapted to receive a remotely transmitted signal. Although embodiments of the external cargo indicator 10 may include an external switch mounted outside the vehicle at a location at or near where the cargo is mounted, preferred embodiments of the invention include a cargo indicator 10 located inside of the vehicle, simply requiring a driver's input to enable or disable the cargo reminder 1.

As further illustrated in FIG. 1, the microprocessor 5 is also connected to an audio alarm 12 and a visual alarm 13. Once the driver slows down at or above the user-adjustable, preset acceleration threshold, the audio alarm 12, the visual alarm 13, or a combination audio/visual alarm is triggered by the microprocessor 5, thereby reminding the driver of an external cargo being carried and the potential impact against external obstructions. One or both of the audio alarm 12 or the visual alarm 13 may be disabled by the driver by pressing the mute key 9. The audio alarm 12 and visual alarm 13 may be a single unit integrated to the cargo reminder 1 or they may be combined or separate units that are plugged into the cargo reminder 1 and placed anywhere inside of the vehicle.

In another embodiment of the invention, the individual alarms are connected to the cargo reminder 1 via a wireless connection. In other preferred embodiments a plug-in vibrator clip alarm 14 may be used instead of, or together with, the audio and visual alarms 12 and 13. The plug-in vibrator clip alarm 14 is operated in a manner similar to the audio and visual alarms 12 and 13 as already explained. The invention may also incorporate a mute key 9 for the audio alarm 12 and another for the visual alarm 13. A single mute key 9 may also operate both the visual alarm 10 and the audio alarm 13. In addition, in another embodiment of the instant invention, once the alarm has been triggered, it will not activate again until a user adjustable time period entered in the delay setting key 8 has expired.

The inclination or slope presented to the driver in the digital display 11 may be in the form of angular inclination, percent grade, or a combination of both. This road inclination or slope is calculated by monitoring the output of the accelerometer 3, which, besides monitoring other accelerating and decelerating forces acting on the vehicle, also detects changes in gravitational forces due to changes in road inclination. In cases when the cargo reminder 1 is placed on an inclined surface inside the vehicle, as also shown in FIG. 1, a level offset key 7 permits the driver to correct the accelerometer output to account for the signal generated by the inclination of the cargo reminder 1. In addition, a battery 2 is provided to power the cargo reminder 1; however, in another preferred embodiment, the cargo reminder 1 is connected to a power outlet in the vehicle, or otherwise directly wired to the electric circuit of the car.

Those of ordinary skill in the art will know that different types of accelerometers 3 may be used in the instant invention, including, but not limited to, two-axis accelerometers, pendulum-type accelerometers, spring-loaded sliding accelerometers, and flexible-coil-around-a-center-post accelerometers. Furthermore, multiple accelerometer inputs may be employed to reduce vibration noise in the signals.

Figure 2:
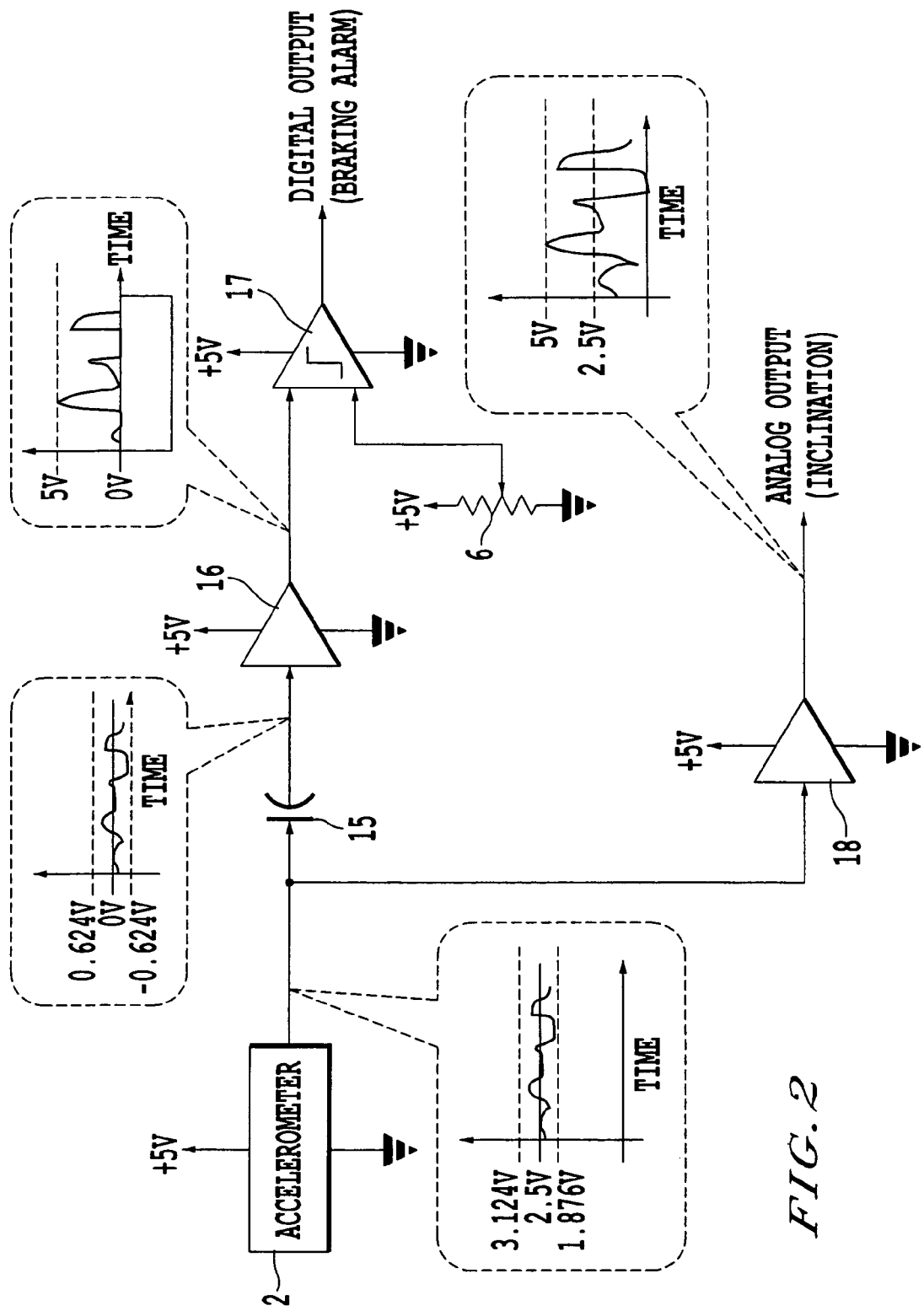
FIG. 2 illustrates an electronic diagram of a first embodiment of the cargo reminder of the invention.
Figure 3:
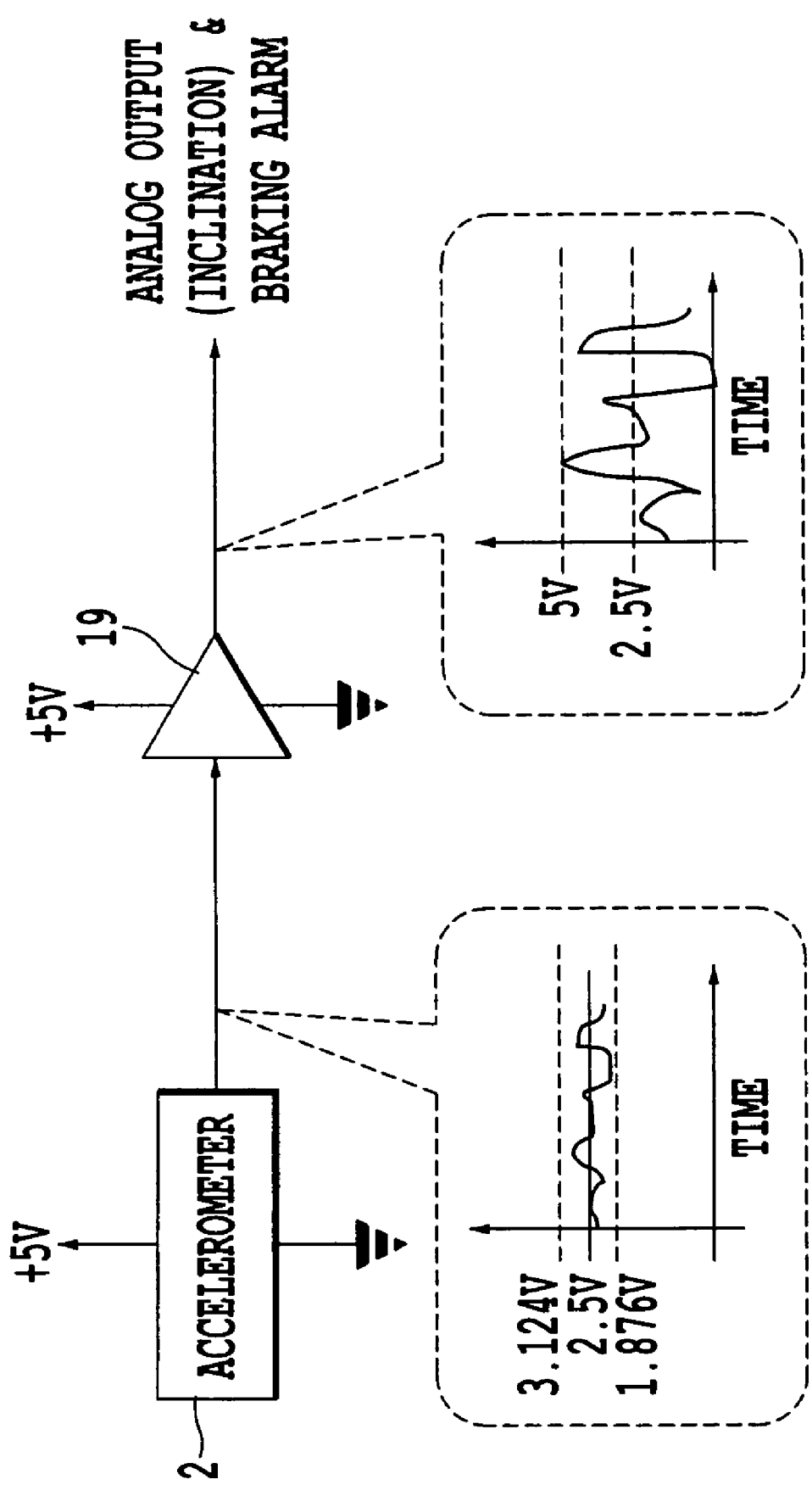
FIG. 3 illustrates an electronic diagram of a second embodiment of the cargo reminder of the invention.

Two non-limiting examples of signal conditioning electronics for the present invention are shown in FIGS. 2 and 3. In FIG. 2, the output signal of accelerometer 2 is fed to separate signal conditioning circuits for the cargo reminder 1 and for the inclinometer. In the cargo reminder circuit, a DC component of the accelerometer signal is first removed by a capacitor 15 and subsequently fed to an amplifier 16 in order to improve the signal-to-noise ratio of the accelerometer signal as well as the resolution of the cargo reminder system. Although capacitor 15 has been illustrated as an element to filter out the DC component of the accelerometer signal, any filtering device would be acceptable. In the non-limiting example shown in FIG. 2, amplifier 16 amplifies only the positive component of the accelerometer signal because a braking action normally generates a positive voltage signal from an accelerometer. However, the removal of any negative voltage component of the accelerometer signal is not required. The amplified signal from amplifier 16 is then fed to a comparator amplifier 17. The comparator amplifier 17 compares, as a function of time, the amplified voltage signal from the accelerometer 3 against a threshold acceleration value set by the acceleration threshold key 6, illustrated in FIG. 2, as a non-limiting example, as a potentiometer. The output of the comparator amplifier 17 may then be fed to a microprocessors 5 (not shown) for further conditioning or used to drive the audio and/or visual alarms 12 and 13.

Those of ordinary skill in the applicable arts will understand that one of the advantages of the signal conditioning circuit for the cargo reminder system illustrated in FIG. 2 is that an analog-to-digital, or A/D, converter may not be necessary, if an inclinometer is not used, thus eliminating the need for the microprocessor 5 in order to implement the invention. As further illustrated in FIG. 2, the output signal of accelerometer 2 is also fed to an amplifier 18, which generates an amplified analog signal representing the inclination. The signal output of amplifier 18 is then fed into an A/D converter for proper representation of the inclination in the digital display 11 as previously explained. Although not illustrated here, it is also possible for one to display the inclination signal from amplifier 18 using an analog meter instead.

Figure 4:
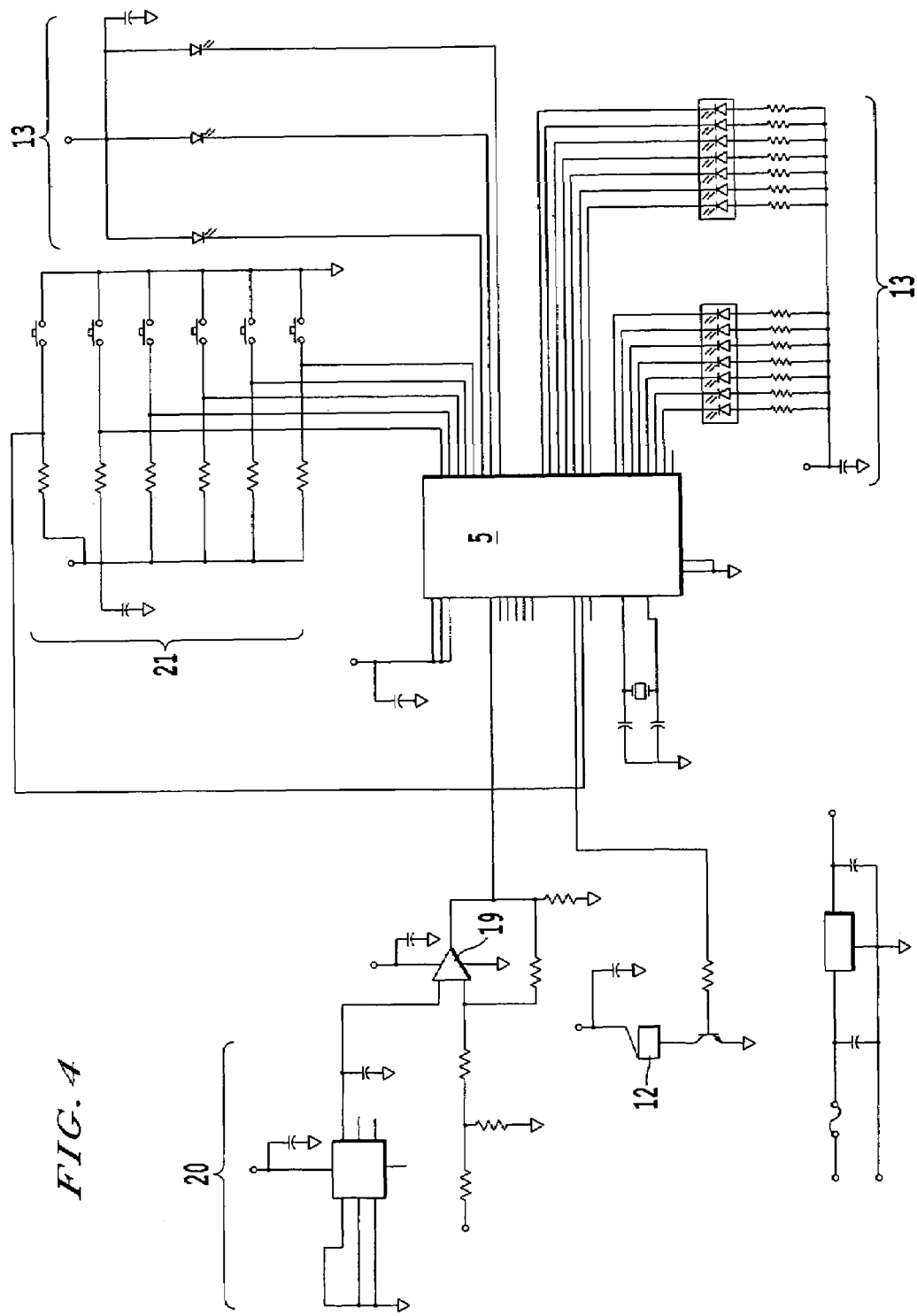
FIG. 4 is an electronic schematic of the embodiment of FIG. 3.

FIG. 3 illustrates another preferred embodiment of the electronics for conditioning of the accelerometer signal when practicing the invention. In this case, the signal from the accelerometer 2 is amplified by amplifier 19 and its analog output is then fed to an A/D input of a microprocessor 5 (not shown) for further analysis to generate cargo reminder and inclinometer signals. FIG. 4 is a circuit diagram of the invention illustrated in FIG. 3. As shown in FIG. 4, the signal output of accelerometer 2 is first fed to signal conditioning circuitry 20, which adjust signal gains and ranges, and then amplified by amplifier 19. The A/D input of the microprocessor 5 then receives that amplified and conditioned signal from the accelerometer 2. As shown, a set of switches 21, including, but not limited to, switches for mode selection, up-and-down adjustments, the delay setting key 8, the mute key 9, an the cargo indicator 10 (labeled "no bike") are used to adjust those different setting of the invention. The visual alarm 13 is illustrated in FIG. 4 as a set of LED lights. The audio alarm 12 is also illustrated as well as the circuitry used to operate the two seven-segment displays of the digital display 11 for the inclinometer incorporated in one of the preferred embodiments of the present invention. Although FIGS. 2-4 illustrate examples of the use of this invention taking advantage of digital electronics, those of ordinary skill in the applicable arts will understand that the inventions disclosed may also be implemented using analog electronics.

In use, when cargo is present, a driver will power the cargo reminder and will activate the cargo indicator, thus generating a signal indicative of the presence of cargo. While driving, when the driver slows down at an acceleration equal to or above a preset acceleration threshold, an alarm is triggered, thereby reminding the driver of an external cargo being carried and the potential impact against external obstructions.

Obviously, numerous modifications and variations of the disclosed inventions are possible in light of the above teachings. It is therefore to be understood that within the scope of the appended claims, the invention may be practiced otherwise than as specifically described herein.

What is claimed is:

1. A cargo reminder for a driver of a vehicle, comprising:
   an accelerometer;
   a controller adapted to output a reminder signal upon receiving an input signal indicative of the presence of a cargo and an output signal from the accelerometer larger than a preset acceleration threshold;
   an alarm connected to the controller, the alarm being triggered by the reminder signal; and
   an acceleration threshold input connected to the controller and configured to allow the driver to input the preset acceleration threshold.

2. The cargo reminder of claim 1, wherein the alarm is at least one of a visual alarm, an audio alarm, or a plug-in vibrator clip alarm.

3. The cargo reminder of claim 1, further comprising:
   a cargo indicator input connected to the controller to generate the input signal indicative of the presence of the cargo to allow the driver to enable or disable the cargo reminder.

4. The cargo reminder of claim 1, further comprising:
   a delay setting input connected to the controller to allow the driver to input a time delay between first and second alarm triggers.

5. The cargo reminder of claim 1, further comprising:
   an alarm mute input connected to the controller to allow the driver to mute the alarm after the alarm is triggered.

6. The cargo reminder of claim 1, further comprising:
   an output display connected to the controller configured to display an inclination of a road traveled by the vehicle, the inclination being calculated by the controller based on the output signals from the accelerometer.

7. The cargo reminder of claim 6, further comprising:
   a level offset adjustment connected to the controller to allow the driver to calibrate the cargo reminder when the cargo reminder is placed on an inclined surface inside the vehicle.

8. The cargo reminder of claim 6, wherein the inclination is displayed as an angular inclination, a percent grade, or a combination thereof.

9. The cargo reminder of claim 1, wherein the cargo reminder is wired to an electric circuit of the vehicle such that, when the vehicle is started, the cargo reminder turns on.

10. The cargo reminder of claim 1, wherein the cargo reminder is plugged in to a power outlet in the vehicle.

11. The cargo reminder of claim 1, wherein the cargo reminder is battery powered.

12. The cargo reminder of claim 1, wherein the cargo reminder is portable.

13. The cargo reminder of claim 1, wherein the accelerometer is at least one of a two-axis accelerometer, a spring-loaded sliding accelerometer, a pendulum accelerometer, or flexible-coil-around-a-center-post accelerometer.

14. The cargo reminder of claim 1, wherein the controller is a microprocessor.

15. The cargo reminder of claim 1, wherein the controller is analog.

16. A cargo reminder for a driver of a vehicle, comprising:
   an accelerometer;
   a controller adapted to output a reminder signal upon receiving an input signal indicative of a presence of a cargo and an output signal from the accelerometer larger than a preset acceleration threshold;
   an alarm connected to the controller, the alarm being triggered by the reminder signal from the controller;
   an acceleration threshold input connected to the controller and configured to allow the driver to input the preset acceleration threshold; and
   a delay setting input connected to the controller to allow the driver to input a time delay between first and second alarm triggers, wherein the alarm is at least one of a visual alarm, an audio alarm, or a plug-in vibrator clip alarm.

17. The cargo reminder of claim 16, further comprising: an alarm mute input connected to the controller to allow the driver to mute the alarm after the alarm is triggered.

18. The cargo reminder of claim 16, further comprising: a cargo indicator input connected to the controller to generate the input signal indicative of the presence of the cargo.

19. The cargo reminder of claim 16, further comprising: an output display connected to the controller configured to display an inclination of a road traveled by the vehicle, the inclination being calculated by the controller based on output signals from the accelerometer.

20. The cargo reminder of claim 16, further comprising: a level offset adjustment connected to the controller to allow the driver to calibrate the cargo reminder when the cargo reminder is placed on an inclined surface inside the vehicle.

21. The cargo reminder of claim 19, wherein the inclination is displayed as an angular inclination, a percent grade, or a combination thereof.

22. The cargo reminder of claim 16, wherein the cargo reminder is wired to an electric circuit of the vehicle such that, when the vehicle is started, the cargo reminder turns on.

23. The cargo reminder of claim 16, wherein the cargo reminder is plugged in to a power outlet in the vehicle.

24. A method for reminding a driver of a vehicle of an external cargo being transported, comprising:
   measuring an acceleration change of the vehicle with an accelerometer;
   generating a reminder signal by a controller adapted to generate the reminder signal upon receiving an input signal indicative of a presence of a cargo and an output signal from the accelerometer larger than a preset acceleration threshold;
   triggering an alarm connected to the controller by the reminder signal from the controller; and
   inputting the acceleration threshold into the controller via an acceleration threshold input connected thereto.

25. The method of claim 24, wherein the triggering comprises triggering at least one of a visual alarm, an audio alarm, or plug-in vibrator clip alarm.

26. The method of claim 24, further comprising: inputting the input signal indicative of the presence of the cargo via a cargo indicator input connected to the controller.

27. The method of claim 24, further comprising: inputting a time delay into the controller via a time delay input connected thereto; and
   delaying a second triggering from a first triggering by an elapsed time equal to or greater than the time delay.

28. The method of claim 24, further comprising: displaying an inclination of a road traveled by the vehicle, the inclination being calculated by the controller based on output signals from the accelerometer.

29. A cargo reminder for a driver of a vehicle, comprising: an accelerometer;
   means for generating a reminder to the driver that an external cargo is being transported based on a change in vehicle acceleration detected by the accelerometer; and
   means for inputting the acceleration threshold into a controller of the cargo reminder via an acceleration threshold input connected thereto.

30. The cargo reminder of claim 29, further comprising: delay setting input means for allowing the driver to input a time delay between first and second alarm triggers of an alarm,
   wherein the alarm is at least one of a visual alarm, an audio alarm, or a plug-in vibrator clip alarm.

* * * * *